US012467678B2

(12) United States Patent
Fox et al.

(10) Patent No.: US 12,467,678 B2
(45) Date of Patent: Nov. 11, 2025

(54) HEAT PUMP AND HOUSING FOR A HEAT PUMP

(71) Applicant: EXERGYN LTD., Dublin (IE)

(72) Inventors: Laura Fox, Dublin (IE); Fintan McDonnell, Dublin (IE); Matthieu Morhan, Dublin (IE)

(73) Assignee: EXERGYN LTD., Dublin (IE)

( * ) Notice: Subject to any disclaimer, the term of this patent is extended or adjusted under 35 U.S.C. 154(b) by 82 days.

(21) Appl. No.: 17/632,384

(22) PCT Filed: Aug. 2, 2020

(86) PCT No.: PCT/EP2020/071752

§ 371 (c)(1),
(2) Date: Feb. 2, 2022

(87) PCT Pub. No.: WO2021/023686

PCT Pub. Date: Feb. 11, 2021

(65) Prior Publication Data

US 2022/0357095 A1 Nov. 10, 2022

(30) Foreign Application Priority Data

Aug. 2, 2019 (GB) .................................... 1911108

(51) Int. Cl.
*F25D 19/00* (2006.01)
*F16M 1/04* (2006.01)

(52) U.S. Cl.
CPC ............... *F25D 19/00* (2013.01); *F16M 1/04* (2013.01)

(58) Field of Classification Search
CPC ............ F25D 19/00; F25B 23/00; F16M 1/04
See application file for complete search history.

(56) References Cited

U.S. PATENT DOCUMENTS

| | | | | |
|---|---|---|---|---|
| 10,119,059 | B2 * | 11/2018 | Cui | F03G 7/0614 |
| 2016/0084544 | A1 | 3/2016 | Radermacher et al. | |
| 2016/0208783 | A1 | 7/2016 | Cullen et al. | |

FOREIGN PATENT DOCUMENTS

| | | | |
|---|---|---|---|
| CN | 106052190 | A | 10/2016 |
| CN | 107289668 | A | 10/2017 |
| CN | 107421096 | A | 12/2017 |
| EP | 3317535 | B1 | 5/2018 |
| GB | 2497542 | A | 6/2013 |
| GB | 2533357 | A | 6/2016 |

(Continued)

OTHER PUBLICATIONS

Machine English language translation of JP 2015068604 to Ko et al. (translated Sep. 2023) (Year: 2015).*

*Primary Examiner* — Cassey D Bauer
(74) *Attorney, Agent, or Firm* — NIXON PEABODY LLP; David S. Resnick; Sorinel Cimpoes

(57) ABSTRACT

The invention provides a heat pump system comprising a base support; a top support and one or more elongated support structures connected to the base support and the top support. A hydraulic system configured to provide a compression stress to at least one SMA or NTE or elastocaloric core during use. An inlet for receiving fluid and an outlet for exiting the fluid; and at least one valve configured to control the inlet and the outlet. The elongated support is configured to engage with the SMA core to prevent the SMA material buckling when a compression stress is applied.

12 Claims, 7 Drawing Sheets

(56) References Cited

FOREIGN PATENT DOCUMENTS

| | | | | |
|---|---|---|---|---|
| JP | 2015068604 | * | 4/2015 | .............. F25B 23/00 |
| WO | 2014198904 | A1 | 12/2014 | |
| WO | 2017001521 | A1 | 1/2017 | |
| WO | 2018229231 | A1 | 12/2018 | |

* cited by examiner

HEAT PUMP AND HOUSING FOR A HEAT PUMP

CROSS-REFERENCE TO RELATED APPLICATIONS

This application is a 35 U.S.C. § 371 National Phase Entry application of International Application No. PCT/EP2020/071752 filed Aug. 2, 2020, which designates the U.S. and claims benefit under 35 U.S.C. § 119 (a) of GB Application No. 1911108.7 filed Aug. 2, 2019, the contents of which are incorporated herein by reference in their entireties.

FIELD

This disclosure relates to a heat pump. In particular this disclosure relates to a heat pump for heating systems and/or cooling systems such as an air conditioning/refrigeration system.

BACKGROUND

Heat Pump ("HP") technologies have gained wide commercial acceptance in heating, ventilation & air conditioning ("HVAC") and refrigeration applications. They can offer energy savings and emissions reductions and are typically installed for heating and cooling systems in buildings or car applications etc.

There are several types of heat pump. Most existing technologies utilise a refrigerant in expansion/compression cycles, many heat pumps are classified by the source of the heat e.g. air source heat pump or ground source heat pump. The fundamental technology used in the heat pump is similar. Air source heat pumps have limited performance in cold temperature (at −18° C., Coefficient of Performance (CoP) tends to be around 1 (due to Carnot) so electrical resistance heating is more effective, at higher operating temperatures the CoP can reach 4). Ground source heat pumps have more stable inlet temperature but are limited by the CoP of present technology.

There is a global need to decarbonise heating and cooling in buildings. Heating generally uses combustion of carbon-based fuel, which releases carbon into the atmosphere. Cooling and air conditioning can be a major electrical load in warmer climates. Heat pumps can potentially deliver heating and cooling from a single package. If a heat pump uses renewable electricity, then it can be classed as a zero-emission technology. Current heat pump technologies generally use refrigerants with high global warming potential and can have high toxicity, which is undesirable. Refrigerant leakage is a major cause of climate change and it also causes a reduction in performance. Fans and pumps within current heat pump technology have a noise signature which can be intrusive. Current HP technology has a CoP of 3 to 4. By increasing the CoP, electricity consumption can be reduced, this reduces carbon emissions if non-renewable electricity is used. Moreover, conventional heat pump technologies can have a CoP which is affected by ambient air temperature which is undesirable. US patent publication number US20160084544, Radermacher et al, discloses a heat pump system that uses SMA material tubes, where they are filled with other tubes or rods of an unknown material to take up volume and to therefore remove dead thermal mass to help boost the efficiency of the system. However, a problem with this configuration is that they are thermally inefficient and do not expand and/or contract uniformly and the CoP values generated are poor.

In addition, the SMA material is prone to buckling leading to the failure of the heat pump system. One method to reduce the buckling propensity of the SMA material is to increase the diameter of the SMA rod in compression. However, in doing so, the surface area to volume ratio increases, resulting in a reduction in the rate of heat transfer, and ultimately the deltaT achievable for a fixed flow rate.

It is therefore an object to produce a housing for a heat pump system that increases the lifetime of the core material and overcomes at least one of the above mentioned problems. It is another object to provide heat transfer optimisation in a heat pump.

SUMMARY

According to the invention, there is provided, as set out in the appended claims, a heat pump system comprising:

- a base support;
- a top support;
- one or more elongated support structures connected to the base support and the top support;
- a stress module or a hydraulic system configured to provide a compression stress to at least one SMA or Negative Thermal Expansion (NTE) or elastocaloric core during use;
- an inlet for receiving fluid and an outlet for exiting the fluid; and
- at least one valve configured to control the inlet and the outlet.

Compression is fundamentally required to generate the stresses necessary to achieve the requisite temperature lifts and CoPs whilst allowing a virtually unlimited fatigue life. Without the capability to produce a heat pump that can withstand the loading in its supporting structure and the ability to control this for both individual rods and multiple rods it is not possible to produce a heat pump that can perform HP cycles in compression. The housing for the heat pump described herein, according to the present invention, overcomes these problems.

In one embodiment at least one elongated support is configured to engage with the SMA core to prevent the SMA material buckling when a compression stress is applied.

In one embodiment there is provided a plurality of slots, wherein each slot is dimensioned to securely facilitate at least one SMA or NTE core.

In one embodiment there is provided an elongated support structure for each SMA core complementarily arranged to support each SMA core when a compression stress is applied.

In one embodiment there is provided a plurality of SMA cores arranged in different orientations in the housing to form a static drum.

In one embodiment a plurality of SMA cores are arranged in different orientations in the housing to form a rotating drum.

In one embodiment the rotating drum is configured to rotate in the housing.

In one embodiment the at least one SMA or NTE core adapted to absorb heat and store energy in response to a first fluid inputted at a first temperature in the housing.

In another embodiment there is provided a cooling or refrigeration system comprising:

- a base support;
- a top support;

one or more elongated support structures connected to the base support and the top support;

a stress module or a hydraulic system configured to provide a compression stress to at least one SMA or NTE or elastocaloric core during use;

an inlet for receiving fluid and an outlet for exiting the fluid; and at least one valve configured to control the inlet and the outlet.

In a further embodiment there is provided a housing for a heat pump system comprising:

a base support;

a top support;

one or more elongated support structures connected to the base support and the top support;

a stress module or a hydraulic system configured to provide a compression stress to at least one SMA or Negative Thermal Expansion (NTE) or elastocaloric core during use;

an inlet for receiving fluid and an outlet for exiting the fluid; and at least one valve configured to control the inlet and the outlet.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
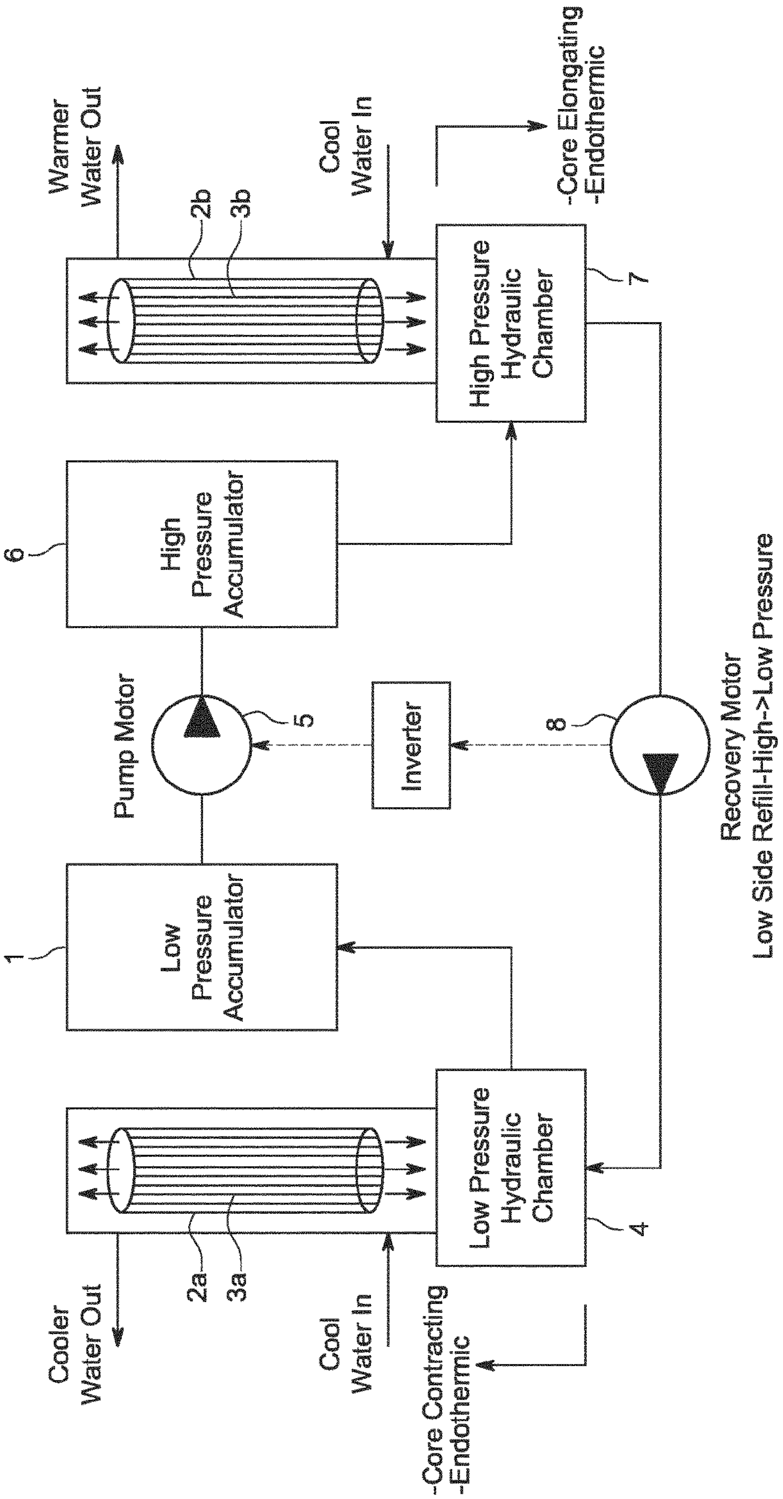
FIG. 1 illustrates a heat pump system incorporating a mechanical configuration having at least one SMA or NTE or elastocaloric core and a transmission system.

The invention relates to a new heat pump cycle which utilises the latent heat from a phase transformation of SMAs or NTEs or elastocaloric materials. The following description of a preferred embodiment of the invention describes a SMA implementation and equally applies to NTEs or elastocaloric material implementations.

The invention can use a particular SMA configuration made up of a plurality of elements, rods or wires packed closely together to define a core. SMA material can exist in two crystalline states, martensite and austenite, and can be reversibly converted from one phase to the other. The austenite to martensite transition of SMA is exothermic. The martensite to austenite transition is endothermic. The temperatures at which the phase change occurs can be manipulated via the application of stress to the SMA material.

SMA is an alloy that exhibits a shape memory effect which once deformed returns to its pre-deformed shape upon stressing and/or heating. This material is a solid-state alternative to conventional actuators such as hydraulic, pneumatic, and/or motor-based systems.

The invention relates to a heat pump system and method which can use either Shape-Memory Alloys (SMAs) or Negative Thermal Expansion materials (NTE) or elastocaloric material. In one embodiment a particular SMA system made up of SMA material can be used. For example, a plurality of elements (or a plurality of groups of elements) or wires packed closely together to define a core. In another example the core can be made up of one or more of the following rod, block, ribbon, strip or plates, 3D printed elements and the like all capable of being subjected to compression, axially or laterally, compression and natural loading, torsional stress to function as a core.

A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, austenite start ($A_s$) and austenite finish ($A_f$), being set to a value below the input temperature of fluid stream. The thermal gradient present therefore allows the heat to transfer into the SMA via conduction and convection from the fluid stream. Once the material has fully or partially transformed to austenite (i.e. the temperature of the SMA material is equal or above $A_f$), the heat absorption phase is complete.

The heat release phase begins after increasing the stress on the austenitic SMA material. This raises the activation temperatures, martensite start ($M_s$) and martensite finish ($M_f$), for the reverse transformation back to martensite. Once the value of $M_s$ is raised above the input fluid stream temperature (the fluid stream can be the same as the heat absorption phase or one at a higher temperature in a heat pump configuration), the reverse transformation begins. It will only complete in full when $M_f$ is also raised above the fluid stream temperature. The latent heat is then released into the material, causing it to increase in temperature, creating a thermal gradient between the SMA material and the fluid stream. Energy/heat is then transferred into the fluid, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used. A system designed to cool would operate the same cycle, however, the performance focus would be on the cool stream output compared to the hot stream for a heat pump configuration.

FIG. 1 illustrates a Heat Pump system incorporating a known SMA drive engine operated in reverse and described in unpublished PCT patent application number PCT/EP2019/052300, assigned to Exergyn Limited, and fully incorporated herein by reference. As shown in FIG. 1 a low-pressure accumulator pressure 1 is applied to a SMA core $2a$ or bundle in a martensite state. Fluid is inserted into a chamber containing the SMA core $2a$ which is at a higher temperature than the $A_s$ and $A_f$, therefore allowing the SMA material to absorb the heat.

Figure 2:
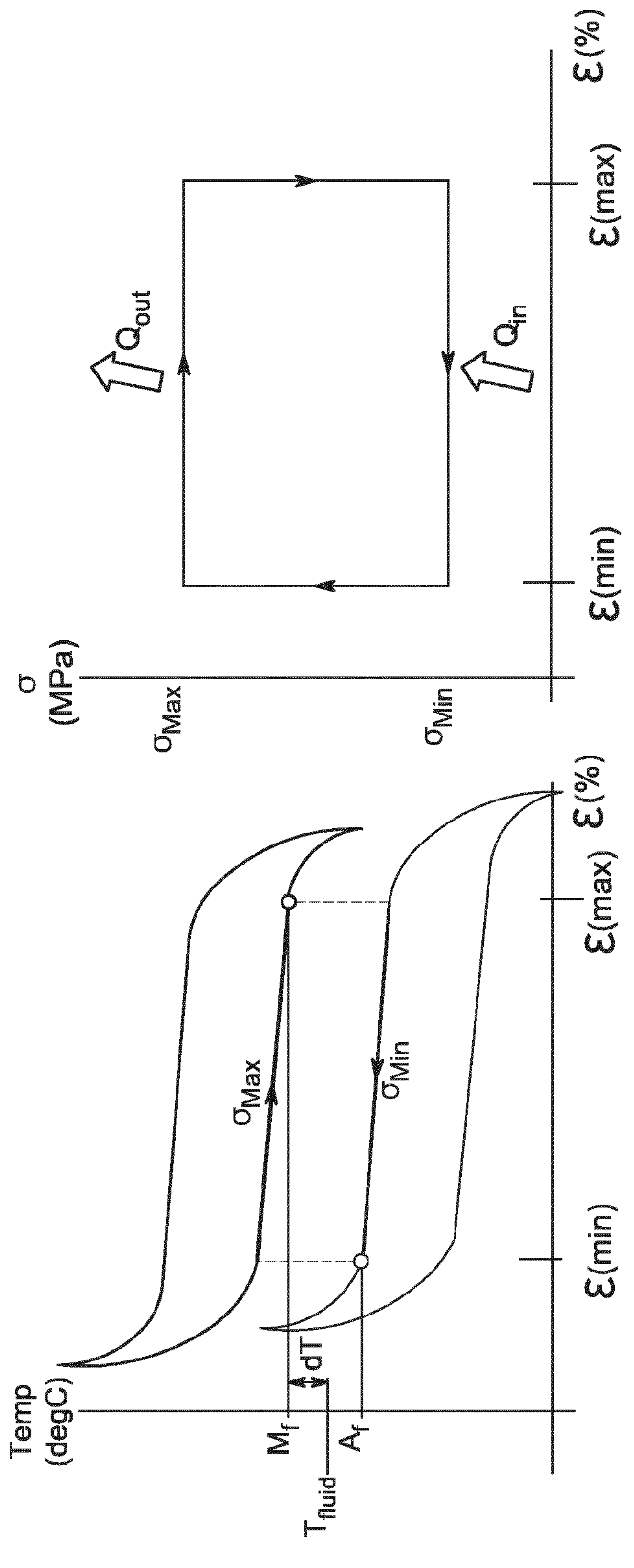
FIG. 2 illustrates a work flow diagram showing different states of the heat pump during operation.

FIG. 2 illustrates a workflow diagram showing different states of the SMA heat pump during operation. As a result of a low-pressure applied (and hence low stress) on the wires, both the austenite start ($A_s$) and austenite finish ($A_f$) temperatures are lowered proportionally, making a full martensite to austenite transformation easier to achieve with the lower input fluid temperature. The SMA material in the core is heated to point $A_f$, as shown in FIG. 2. $A_f$ is the point of maximum contraction of the wire by design—representing a partial or full martensite to austenite transformation.

Figure 3:
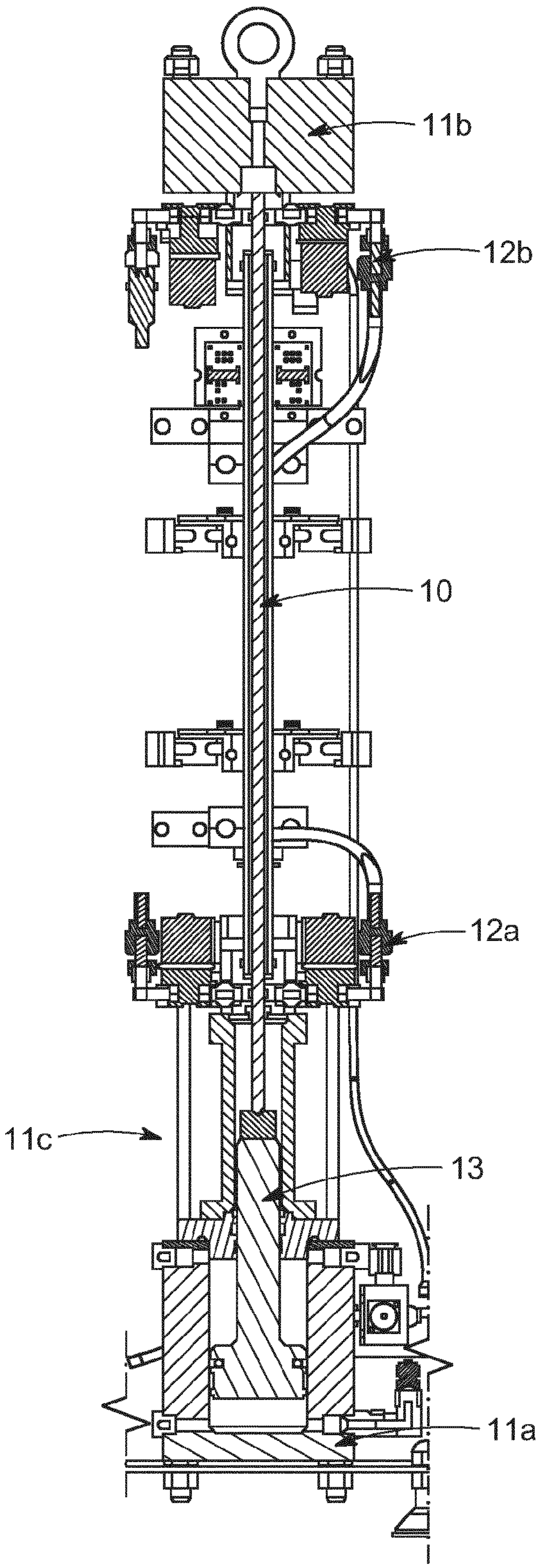
FIG. 3 illustrates an embodiment of the present invention showing a single core in the form of a SMA rod supported by a support system.
Figure 4:
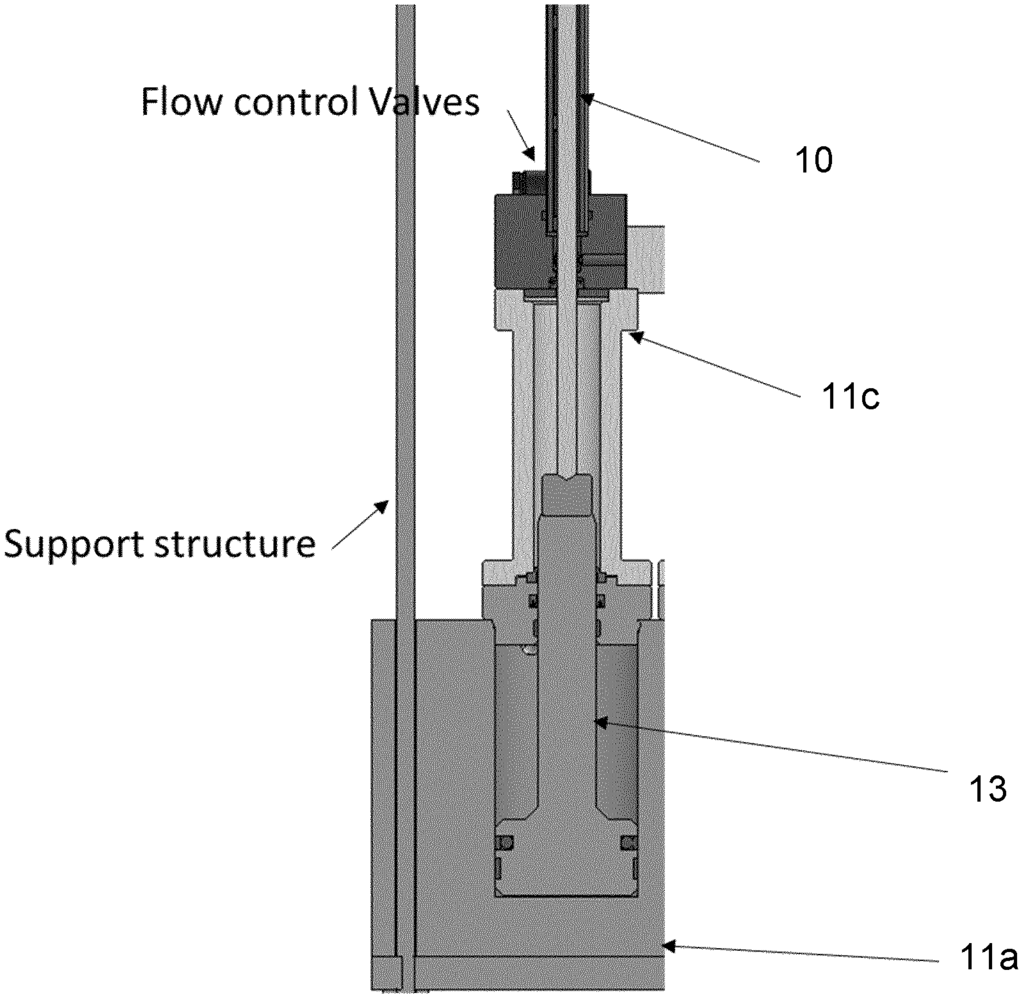
FIG. 4 illustrates a more detailed embodiment of a core at one end engaged with a hydraulic circuit configured to apply a compression force.

FIG. 3 illustrates an embodiment of a housing for a heat pump system comprising a support structure 11 having a base support 11*a* a top support 11*b* and one or more elongated support structures 11*c* connected to the base support 11*a* and the top support 11*b*, a hydraulic system 13 configured to provide a compression stress to at least one SMA or NTE core 10 during use, an inlet 12*a* for receiving fluid and an outlet 12*b* for exiting the fluid and at least one valve configured to control the inlet 12*a* and the outlet 12*b*. The elongated support 11*c* is configured to engage with the SMA core 10 to prevent the SMA material buckling when a compressive stress is applied. FIG. 4 illustrates a hydraulically driven compression core for a SMA heat pump. Change in temperature of fluid streams entering and exiting the core is achieved by hydraulically applying stress to compress the core, in this embodiment a rod of SMA material, and intake or dissipate heat. The process involves sequencing an individual or multiple cores through heat pump cycles. Stress (compression) is applied using hydraulic cycling and fluid flow through the system is achieved using a series of flow control valves and pipework. The elongated support is configured to engage with the SMA core 10 to prevent the SMA material buckling when a compressive stress is applied.

FIG. 4 shows a single rod compression where the rod acts as a SMA core indicated by the reference numeral 10. The single SMA rod 10 undergoes compression in an individual support structure 11 and individual housing for each rod. The structure 11 supports the loads that will be undertaken during cycling. This embodiment can be run on its own or on a multiple core/rod basis. This is achieved by allowing multiple individual cores to run together whilst being controlled separately. The cores can be set up to run in series/cascade/parallel. In FIG. 4 pressure is applied by a hydraulic cylinder 13, however it will be appreciated that the pressure can be applied by other mechanisms, such as pneumatic, linear/electro mechanical actuators, rotary/screw actuators, SMA actuators.

Figure 5:
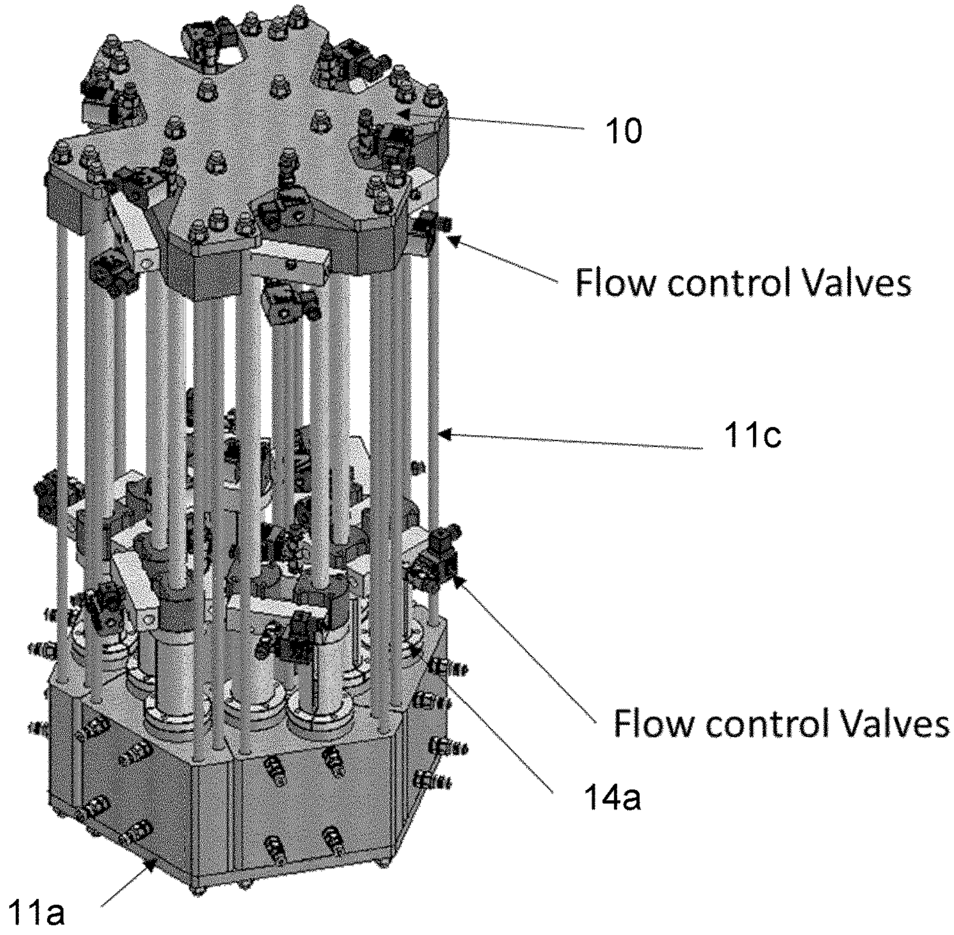
FIG. 5 shows a housing for a heat pump that allows for multiple cores to be inserted in a single housing.

FIG. 5 shows a housing for a heat pump that allows for multiple cores 10 to be inserted in a single housing at a base support 11*a*. The housing comprises a plurality of openings or slots 14, wherein each slot 14*a* is dimensioned to securely facilitate at least one SMA or NTE or elastocaloric core 10 at one end. At the opposite end of the core a second slot 14*b* can be provided to engage and securely hold the core in place in a complementary fashion. This arrangement allows for multiple core or rod compression using a hydraulic circuit 13 or other suitable means in a single housing.

A scaled multiple core configuration can be achieved with several set ups where a plurality of cores 10 undergoing compression are secured in individual housings within one structure or multiple SMA cores undergoing compression secured in a bundle format within a one structure.

Figure 6:
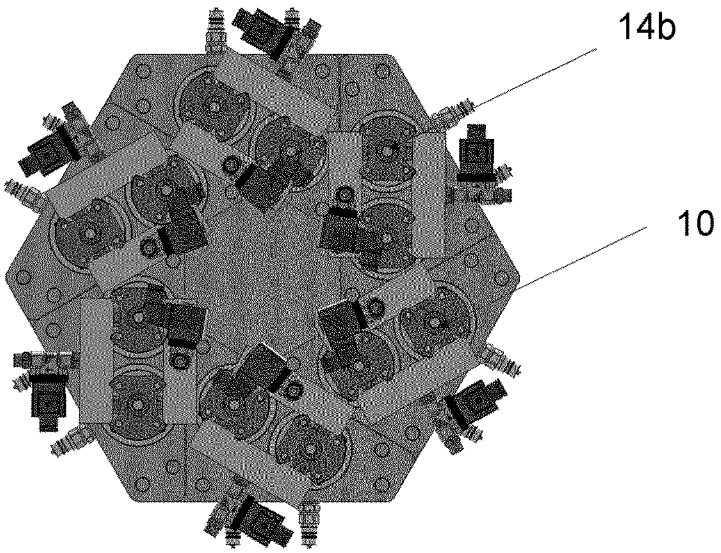
FIG. 6 shows a plan view of the housing illustrated in FIG. 5 with multiple pairs of cores inserted in a plurality of slots.

FIG. 6 shows a plan view of the housing illustrated in FIG. 5 with multiple pairs of cores 10 inserted into each slot 16*b* or opening.

It will be appreciated that the common housing can be contained within one structure. For the successful application of the heat pump the structure has the capability to support the load produced during the heat pump cycle. The housings for the SMA core in compression can be orientated in different configurations to form a core. This includes a static drum or a rotating drum of a plurality of cores arranged substantially parallel to each other. Rotation within this is achieved by rotating either the SMA core, the fluid delivery, the hydraulic components or any combination of the above.

Within the multiple rod configuration there is the capability to control each single core individually or to control multiple cores together where each core can have its own dedicated valve or The assembly configuration for these rods, the supporting/housing structure and the compression geometry can all be varied in producing a SMA heat pump in compression depending on the application required.

Multiple Plate Compression Embodiment

Figure 7:
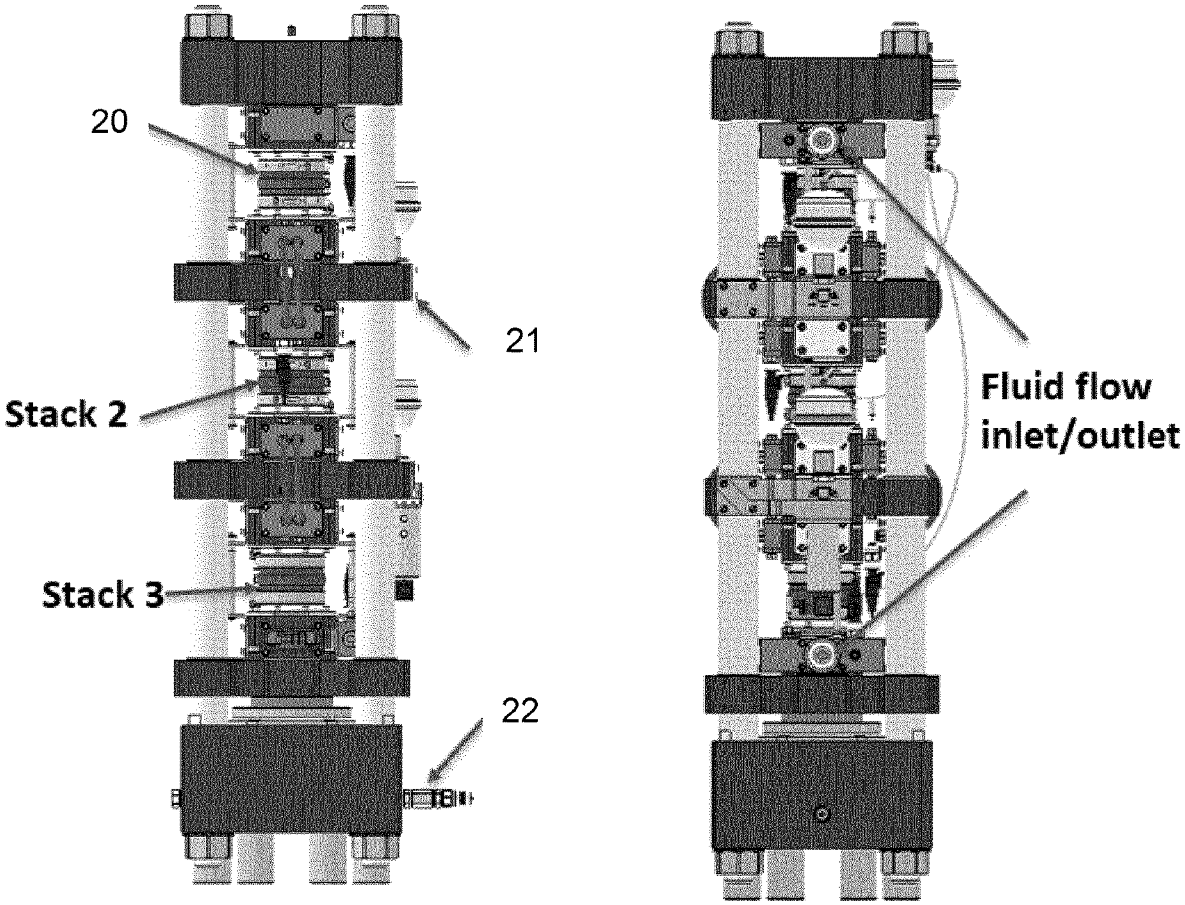
FIG. 7 illustrates individual stacks of multiple plates undergoing compression or stress applied by a hydraulic chamber and piston arrangement.
Figure 8:
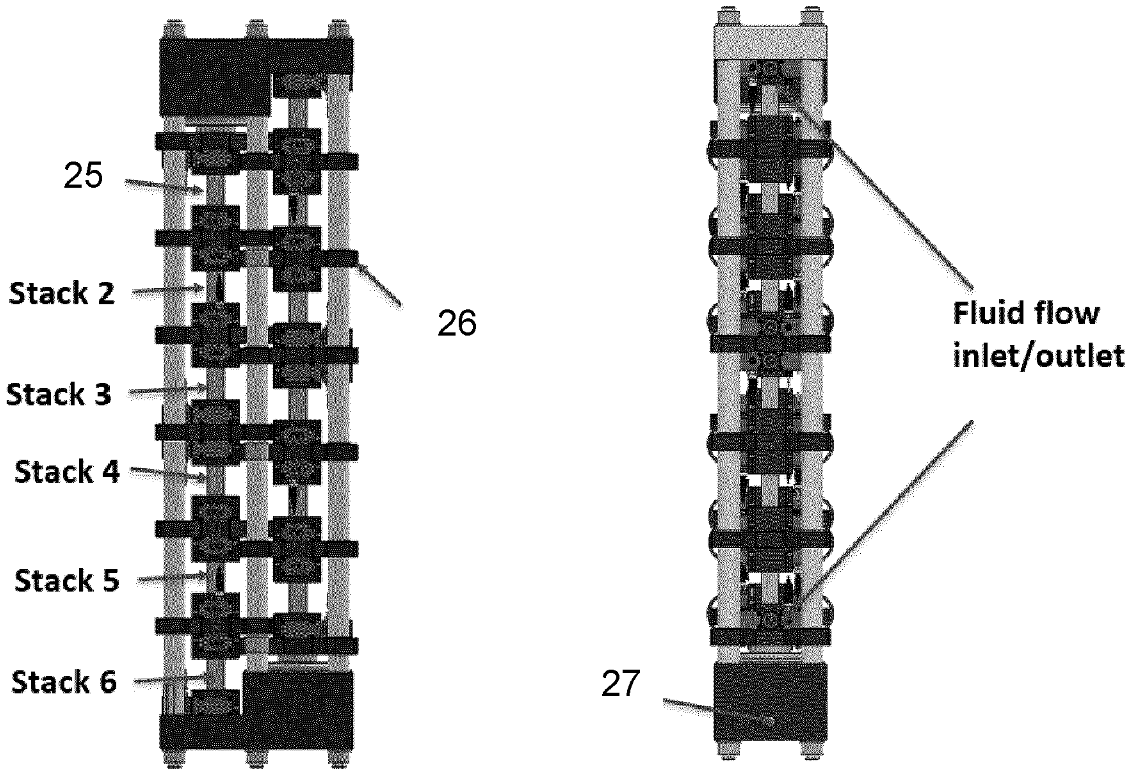
FIG. 8 illustrates vertical combinations of cores contained within a single structure.

A scaled multiple plate configuration can be achieved with a number of different configurations as shown in FIGS. 7 and 8.

FIG. 7 illustrates individual stacks 20 of multiple plates 21 undergoing compression or stress applied by a hydraulic circuit 22 and piston arrangement which are secured in individual housings within one vertical structure to form a core.

As shown in FIG. 8 several vertical combinations of cores 25 are contained within the one structure 26 where a compression or stress is applied by a hydraulic circuit 27. Both embodiments shown in FIGS. 7 and 8 are modular, and the quantity of individual stacks and cores can be increased and decreased as required. An important aspect of the heat pump is that this structure has the capability to support the load produced during the heat pump cycle. Within the multiple core configuration there is the capability to control each single core individually or to control multiple cores together.

The assembly configuration for the plates, the supporting/housing structure, flow paths and the compression geometry shown in FIGS. 7 and 8 provide an effective heat pump in compression.

It will be appreciated that the heat pump system and method as described herein has many applications and can be used in heating (space heating, heat boilers systems or hot water); cooling (air conditioning water coolers, process cooling), reversible heating and cooling (in buildings or in automotive application); refrigeration (domestic and commercial/retail) cryogenic cooling. The heat pump system and method can effectively be applied to any heating or cooling system.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system with a housing for supporting an SMA or NTE or elastocaloric core, the housing comprising:

a base support;

a top support;

a first plurality of SMA or NTE or elastocaloric cores;

each of the first plurality of SMA or NTE or elastocaloric cores comprises one or more elongated support structures connected to the base support and the top support, and each of the first plurality of SMA or NTE or elastocaloric cores comprises a hydraulic system configured to provide a compression stress to one respective SMA or NTE or elastocaloric core during use, wherein at least one of the elongated support structures is configured to engage with the at least one SMA or NTE or elastocaloric core to prevent core buckling when the compression stress is applied;

an inlet for receiving fluid and an outlet for exiting the fluid; and at least one valve configured to control the inlet and the outlet.

2. The housing of claim 1, wherein the at least one of the first plurality of SMA or NTE or elastocaloric core comprises a rod shape of SMA or NTE or elastocaloric material.

3. The housing of claim 1, wherein the at least one of the first plurality of SMA or NTE or elastocaloric core comprises one or more of the following: block, ribbon, strip or plate shape of SMA or NTE or elastocaloric material.

4. The housing of claim 1, further comprising a plurality of slots, wherein each slot of the plurality of slots is dimensioned to securely engage a core end of a respective core of the first plurality of SMA or NTE or elastocaloric cores in a complementary arrangement.

5. The housing of claim 1, further comprising a second plurality of SMA or NTE or elastocaloric cores arranged in different orientations to form a static drum.

6. The housing of claim 1, further comprising a second plurality of SMA or NTE or elastocaloric cores arranged in different orientations in the housing to form a rotating drum.

7. The housing of claim 1, wherein a rotating drum is configured to rotate in the housing.

8. The housing of claim 1, wherein the at least one of the first plurality of SMA or NTE or elastocaloric core is adapted to absorb heat and store thermal energy in response to a first fluid inserted at a first temperature in a housing.

9. A cooling system with a housing for supporting an SMA or NTE or elastocaloric core, the housing comprising:

a base support;

a top support;

a first plurality of SMA or NTE or elastocaloric cores:

each of the first plurality of SMA or NTE or elastocaloric cores comprises one or more elongated support structures connected to the base support and the top support, and each of the first plurality of SMA or NTE or elastocaloric cores comprises a hydraulic system configured to provide a compression stress to one respective SMA or NTE or elastocaloric core during use, wherein at least one of the elongated support structures is configured to engage with the at least one SMA or NTE or elastocaloric core to prevent core buckling when the compression stress is applied;

an inlet for receiving fluid and an outlet for exiting the fluid; and at least one valve configured to control the inlet and the outlet.

10. The housing of claim 9, wherein the at least one of the plurality of SMA or NTE or elastocaloric core comprises a rod shape of SMA or NTE or elastocaloric material.

11. The housing of claim 9, wherein the at least one of the plurality of SMA or NTE or elastocaloric core comprises one or more of the following: block, ribbon, strip or plate shape of SMA or NTE or elastocaloric material.

12. The housing of claim 9, further comprising a plurality of slots, wherein each slot of the plurality of slots is dimensioned to securely engage a core end of a respective core of the first plurality of SMA or NTE or elastocaloric cores in a complementary arrangement.

* * * * *